United States Patent
Lee et al.

(10) Patent No.: US 9,939,057 B2
(45) Date of Patent: Apr. 10, 2018

(54) TORSIONAL VIBRATION DAMPER FOR HYDROKINETIC TORQUE COUPLING DEVICE

(71) Applicant: VALEO EMBRAYAGES, Amiens (FR)

(72) Inventors: Sungchul Lee, Troy, MI (US); Rabah Arhab, Saint-Brice-sous-Foret (FR); Josip Kovac, Northville, MI (US)

(73) Assignee: Valeo Embrayages, Amiens (FR)

( * ) Notice: Subject to any disclaimer, the term of this patent is extended or adjusted under 35 U.S.C. 154(b) by 30 days.

(21) Appl. No.: 14/887,596

(22) Filed: Oct. 20, 2015

(65) Prior Publication Data

US 2017/0108051 A1    Apr. 20, 2017

(51) Int. Cl.
*F16H 45/02* (2006.01)
*F16F 15/123* (2006.01)

(52) U.S. Cl.
CPC ....... *F16H 45/02* (2013.01); *F16F 15/12373* (2013.01); *F16D 2250/0084* (2013.01); *F16H 2045/0205* (2013.01); *F16H 2045/0231* (2013.01); *F16H 2045/0263* (2013.01); *F16H 2045/0278* (2013.01)

(58) Field of Classification Search
CPC ............. F16H 45/02; F16H 2045/0205; F16H 2045/0221–2045/0231; F16H 2045/0263; F16H 2045/0278; F16F 15/123–15/12393; F16F 15/134–15/13492; F16D 2250/00; F16D 2250/0084; Y10T 29/49615; Y10T 29/49789; Y10T 29/49826; Y10T 29/4984
See application file for complete search history.

(56) References Cited

U.S. PATENT DOCUMENTS

| | | | | |
|---|---|---|---|---|
| 2,574,573 A | * | 11/1951 | Libby | F16F 15/12313 192/212 |
| 4,413,711 A | * | 11/1983 | Lamarche | F16F 15/12353 192/213 |
| 4,976,656 A | * | 12/1990 | Bacher | F16F 15/12 192/213.31 |

(Continued)

FOREIGN PATENT DOCUMENTS

| | | |
|---|---|---|
| JP | 2006029553 A | 2/2006 |
| JP | 2008208855 A | 9/2008 |
| WO | WO2014122367 A1 | 8/2014 |

*Primary Examiner* — Richard M Lorence
(74) *Attorney, Agent, or Firm* — Berenato & White, LLC

(57) ABSTRACT

A hydrokinetic torque coupling device comprises a casing rotatable about a rotation axis, a torque converter including an impeller wheel and a turbine wheel disposed in the casing coaxially with the rotation axis, a turbine hub disposed in the casing coaxially with the rotation axis and fixed to the turbine wheel, and a torsional vibration damper. The torsional vibration damper comprises a driven member fixed to the turbine hub, a back plate rotatably mounted to the turbine hub, a plurality of circumferentially acting elastic members, and a damper retainer plate rotatably mounted to the back plate coaxially with the rotation axis. The back plate has a plurality of window-shaped openings separated circumferentially from one another by radial tabs. The elastic members are interposed between the driven member and the back plate in the window-shaped openings. The damper retainer plate is operatively connected to the elastic members.

31 Claims, 11 Drawing Sheets

(56) References Cited

U.S. PATENT DOCUMENTS

| | | | |
|---|---|---|---|
| 7,267,211 B2* | 9/2007 | Yamashita | F16F 15/12366 192/109 R |
| 8,161,740 B2* | 4/2012 | Krause | F16F 15/145 192/30 V |
| 8,602,901 B2 | 12/2013 | Verhoog | |
| 9,360,081 B2* | 6/2016 | Lee | F16F 15/1343 |
| 2007/0051577 A1* | 3/2007 | Avins | F16F 15/12366 192/3.29 |
| 2012/0252587 A1 | 10/2012 | Takikawa et al. | |

* cited by examiner

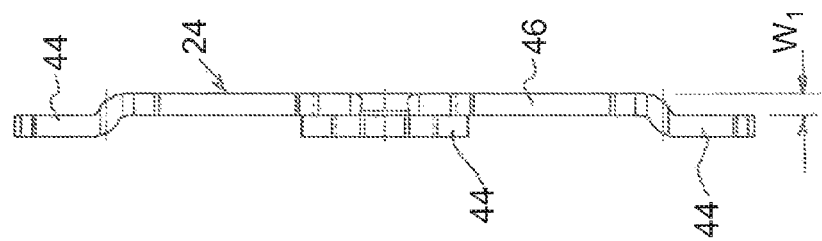
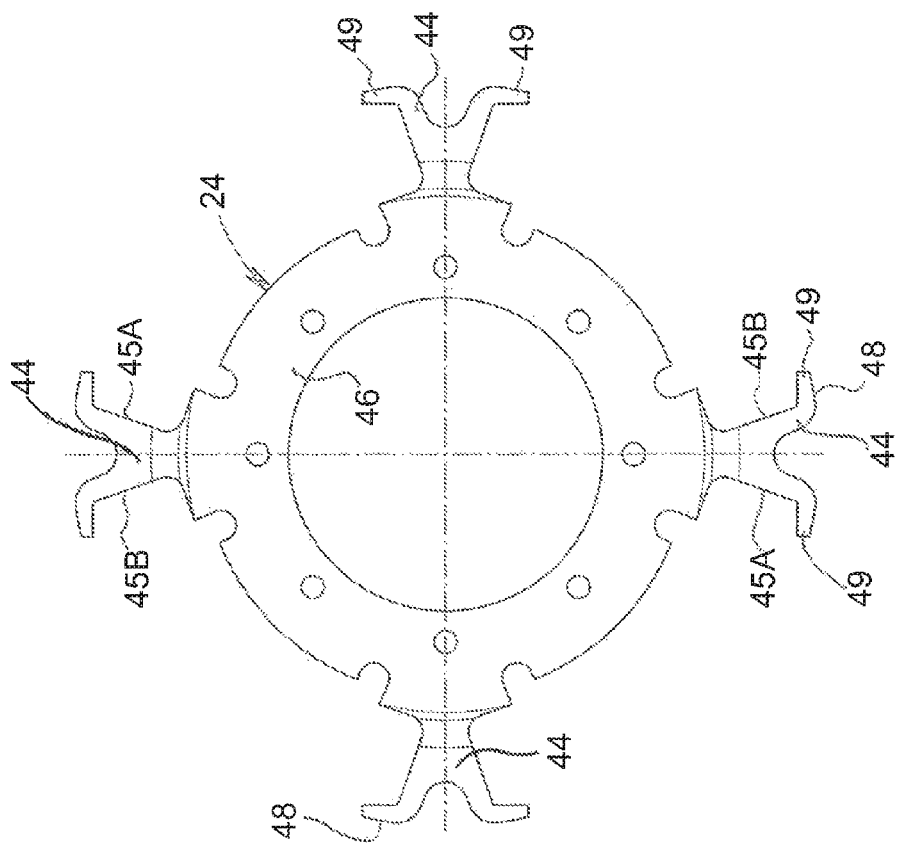

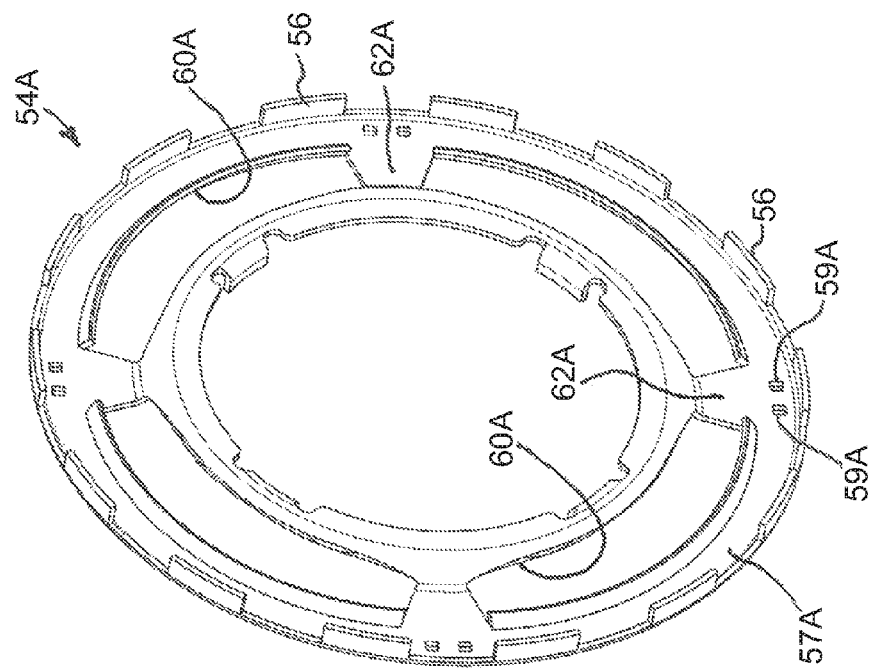
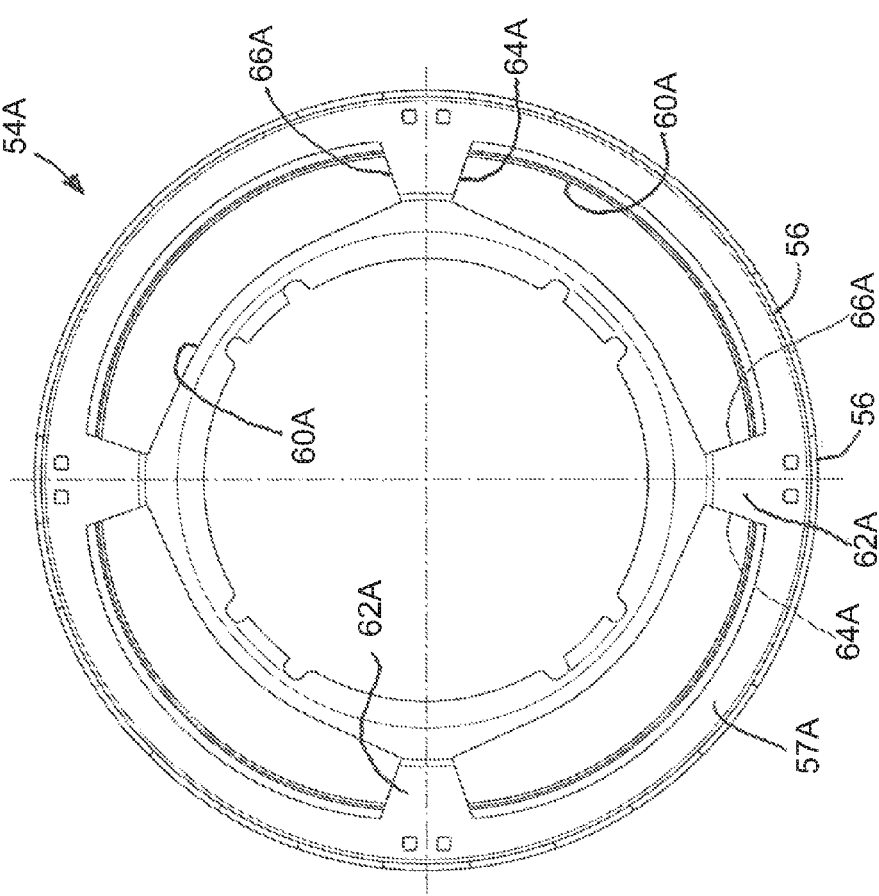

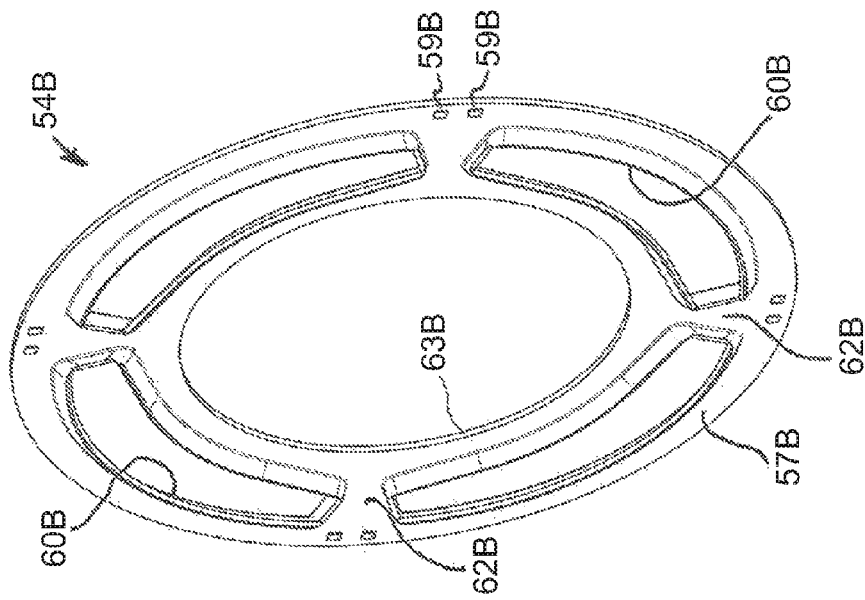
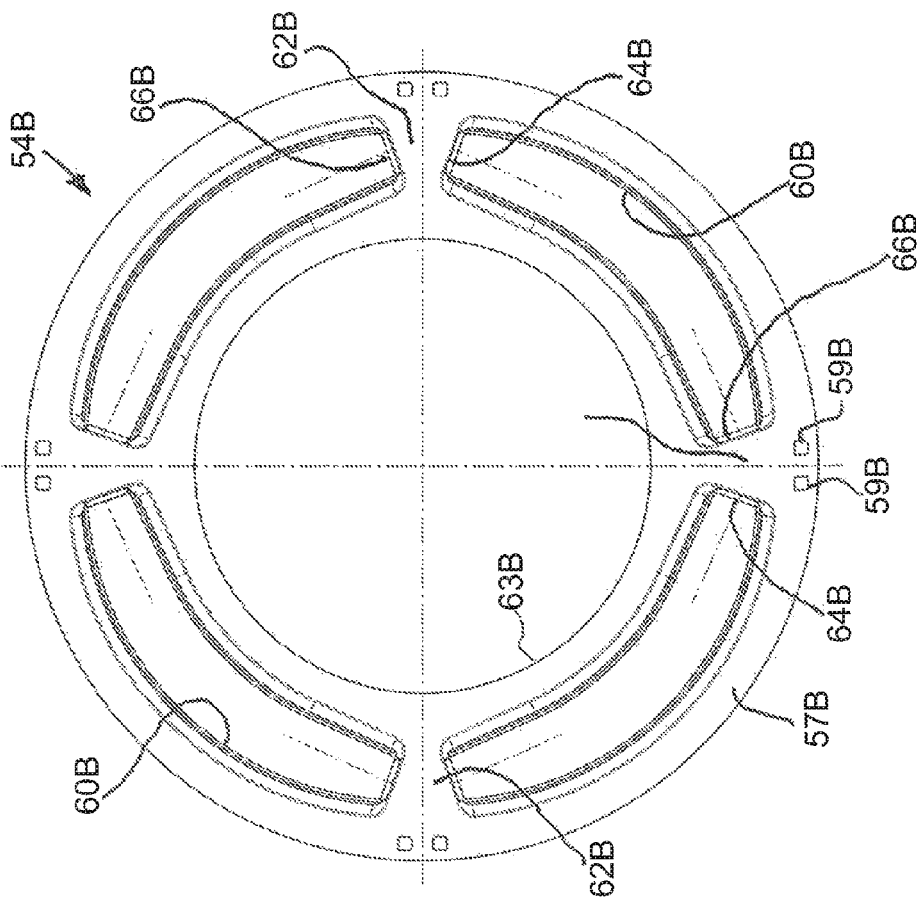

TORSIONAL VIBRATION DAMPER FOR HYDROKINETIC TORQUE COUPLING DEVICE

BACKGROUND OF THE INVENTION

1. Field of the Invention

The present invention generally relates to hydrokinetic torque coupling devices, and more particularly to a hydrokinetic torque coupling device with a torsional vibration damper.

2. Description of the Prior Art

An internal combustion engine exhibits irregularities due to the succession of combustion events in the engine cylinders. Torsion damping devices allow these irregularities to be filtered before the drive torque is transmitted to an automotive transmission. This is because the vibrations must be damped before they enter the transmission and produce unacceptably troublesome noise. To accomplish this, it is known to interpose a torsion damping device between a drive shaft and a transmission (or driven) shaft. The torsion damping device is generally arranged in a hydrokinetic torque coupling device that allows temporary rotational connection of the drive shaft to the transmission shaft.

Typically, a hydrokinetic torque coupling device includes a hydrodynamic torque converter and a torsion damping device positioned between an axially oriented coaxial drive shaft and driven shaft of the automotive transmission. The torsion damping device includes a torque input element and a torque output element, and circumferentially acting elastic members. The circumferentially acting elastic members are interposed between the torque input element and the torque output element. In so-called "long travel" damping devices, the elastic members are mounted, in groups of at least two elastic members, in series between the input element and output element.

A torque converter of this kind typically has a rotating casing that is capable of transmitting drive torque to the damping device by means of a friction locking clutch, traditionally called a lock-up clutch. The torque converter also has a turbine wheel mounted rotatably inside the casing.

For some applications, the torsion damping device may also include a pendulum oscillator conventionally utilized both in friction clutches and in motor vehicle hydrokinetic coupling apparatuses. A pendulum oscillator has at least one pendulum mass or flyweight, generally several, that is arranged around the rotation axis of the engine shaft and is free to oscillate around a rotational oscillation axis substantially parallel to the rotation axis of the engine shaft. When the masses of a pendulum oscillator react to rotational inconsistencies, they move in such a way that a center of gravity of each of the pendulum masses oscillates around an axis substantially parallel to the rotation axis of the engine shaft. The radial position of the center of gravity of each pendulum mass with respect to the rotation axis of the engine shaft, as well as the distance of the center of gravity with respect to the rotational oscillation axis, are established so that in response to centrifugal forces, the oscillation frequency of each of the pendulum masses is proportional to the rotation speed of the engine shaft.

While hydrokinetic torque coupling devices and torsion damping devices, including but not limited to that discussed above, have proven to be acceptable for vehicular driveline applications and conditions, improvements that may enhance their performance and cost are possible.

BRIEF SUMMARY OF THE INVENTION

According to a first aspect of the invention, there is provided a hydrokinetic torque coupling device for coupling together a driving shaft and a driven shaft. The hydrokinetic torque coupling device of the present invention comprises a casing rotatable about a rotation axis, a torque converter including an impeller wheel and a turbine wheel disposed in the casing coaxially with the rotation axis, a turbine hub disposed in the casing coaxially with the rotation axis and non-rotatably secured to the turbine wheel, and a torsional vibration damper. The torsional vibration damper comprises a driven member rotatable about the rotation axis and non-rotatably secured to the turbine hub, a back plate rotatably mounted to the turbine hub and centered on the turbine hub coaxially with the rotation axis, a plurality of circumferentially acting elastic members interposed between the driven member and the back plate in window-shaped openings, and a first damper retainer plate rotatably mounted to the back plate coaxially with the rotation axis, the first damper retainer plate operatively connected to the elastic members. The back plate has a plurality of window-shaped openings circumferentially spaced from one another by radial tabs. The elastic members are interposed between the driven member plate and the first damper retainer plate. The back plate is rotatably mounted to the turbine hub.

According to a second aspect of the present invention, there is provided a torsional vibration damper for a hydrokinetic torque coupling device. The torsional vibration damper of the present invention comprises a driven member rotatable about a rotation axis, a back plate rotatable about the rotation axis, a plurality of circumferentially acting elastic members interposed between the driven member and the back plate in window-shaped openings, and a first damper retainer plate rotatably mounted to the back plate coaxially with the rotation axis. The back plate has a plurality of window-shaped openings circumferentially spaced from one another by radial tabs. The first damper retainer plate is operatively connected to the elastic members. The elastic members are interposed between the driven member plate and the first damper retainer plate.

According to a third aspect of the invention, there is provided a method for manufacturing a torsional vibration damper for a hydrokinetic torque coupling device. The method of the present invention comprises the steps of providing a turbine hub coaxial with a rotation axis, providing a blank sheet in the form of a flat plate having axially opposite plane surfaces and a uniform thickness, cutting the blank sheet so as to form a back plate having a plurality of window-shaped openings circumferentially spaced from one another by radial tabs and a blank for a driven member, forming the driven member by forming a substantially annular flat central plate and a plurality of external radial lugs extending radially outwardly from the central plate so that the external radial lugs of the driven member are axially offset from the central plate thereof, providing a plurality of elastic members, mounting the back plate rotatably to the turbine hub so as to center the back plate coaxially with the rotation axis, mounting the circumferentially acting elastic members between the external radial lugs of the driven member and the radial tabs of the back plate in the window-shaped openings, and non-rotatably securing the driven member to the to the turbine hub.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 9 is a front view of a driven plate in accordance with the exemplary embodiment of the present invention;

FIG. 10 is a side view of the driven plate in accordance with the exemplary embodiment of the present invention;

FIG. 11 is a perspective view of a first damper retainer plate of the torsional vibration damper in accordance with the exemplary embodiment of the present invention;

FIG. 12 is a front view of the first damper retainer plate of the torsional vibration damper in accordance with the exemplary embodiment of the present invention;

FIG. 13 is a perspective view of a second damper retainer plate of the torsional vibration damper in accordance with the exemplary embodiment of the present invention; and FIG. 14 is a rear view of the second damper retainer plate of the torsional vibration damper in accordance with the exemplary embodiment of the present invention.

Figure 1:
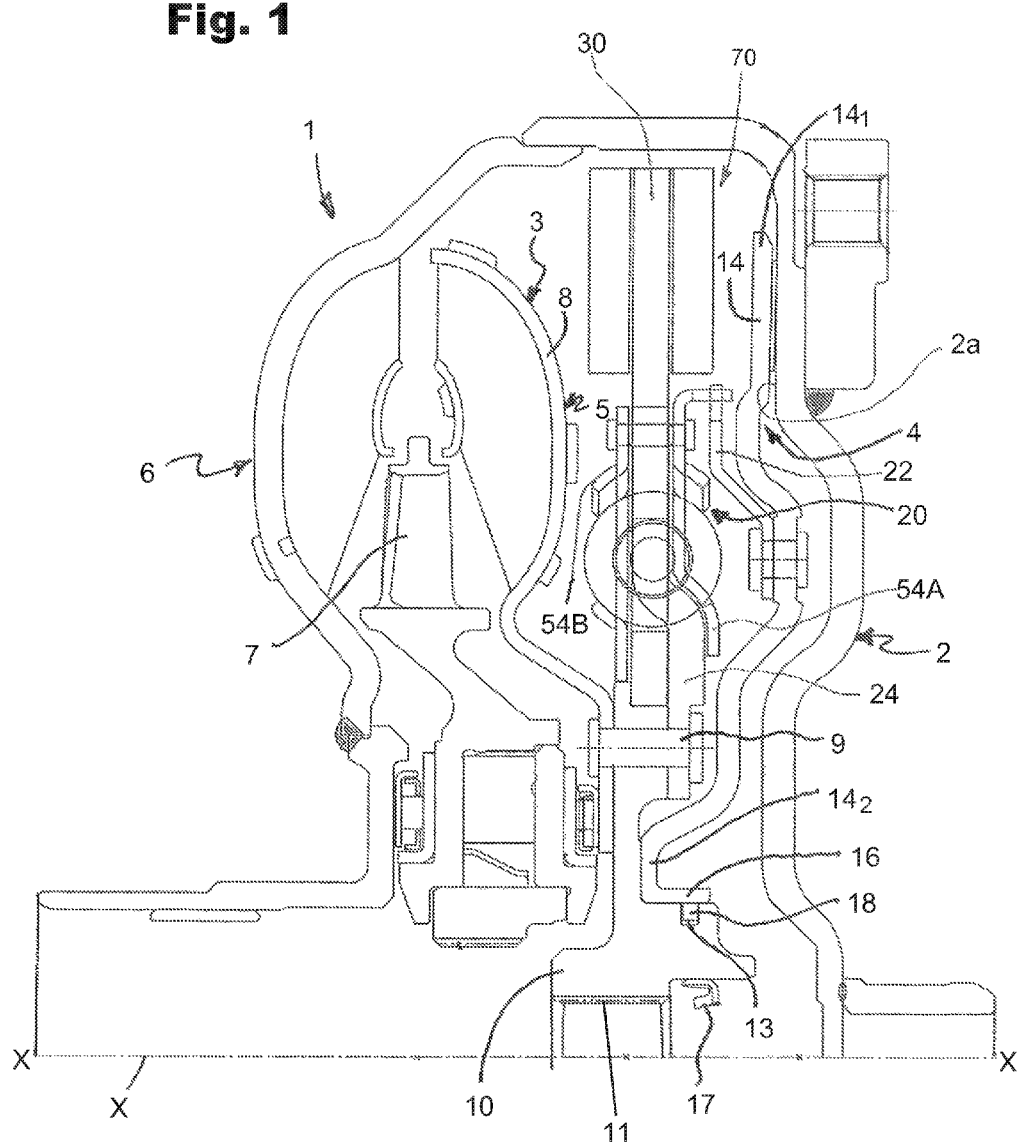
FIG. 1 is a half-view in axial section of a hydrokinetic torque coupling device in accordance with an exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

An exemplary embodiment of a hydrokinetic torque coupling device is generally represented in the accompanying drawings by reference numeral 1, as best shown in a fragmentary sectional view in FIG. 1. The hydrokinetic torque coupling device 1, such as a hydrokinetic torque converter, is intended to couple driving and driven shafts, for example in a motor vehicle. In this case, the driving shaft is an output shaft of an internal combustion engine (not shown) of the motor vehicle and the driven shaft is connected to an automatic transmission of the motor vehicle.

The hydrokinetic torque coupling device 1 comprises a sealed casing 2 filled with oil and rotatable about a rotation axis X. The hydrokinetic torque coupling device 1 further comprises a hydrodynamic torque converter 3, a lock-up clutch 4 and a torsional vibration damper (also referred to herein as a damper assembly) 20, all disposed in the sealed casing 2. Hereinafter the axial and radial orientations are considered with respect to the rotation axis X of the torque coupling device 1. The torque converter 3, the lock-up clutch 4 and the torsional vibration damper 20 are all rotatable about the rotation axis X. The torque converter 3 comprises a turbine wheel 5, an impeller wheel 6, and a reactor (or stator) 7 interposed axially between the turbine wheel 5 and the impeller wheel 6. The turbine wheel 5 includes a substantially semi-toroidal turbine shell 8, best shown in FIG. 1.

The torque coupling device 1 also includes a turbine (or output) hub 10 rotatable about the rotation axis X, which is arranged to non-rotatably couple together the driven shaft and the turbine wheel 5. In the following description, axial and radial orientations will be considered with respect to the rotation axis X of the turbine hub 10.

The turbine shell 8 of the turbine wheel 5 is non-movably (i.e., fixedly) secured to the turbine hub 10 by any appropriate means, such as by rivets 9 or welding. The turbine hub 10 has internal splines 11 and is non-rotatably coupled to the driven shaft, such as an input shaft of the automatic transmission of the motor vehicle, provided with complementary external splines. Alternatively, a weld or other connection may be used to fix (i.e., non-movably secure) the turbine hub 10 to the driven shaft. A radially outer surface of the turbine hub 10 includes an annular slot 13 for receiving a sealing member, such as a sealing ring 18. The turbine hub 10 is rotatable about the axis X and is coaxial with the driven shaft so as to center the turbine wheel 3 on the driven shaft. A sealing member 17, mounted to a radially inner peripheral surface of the turbine hub 10 as shown in FIGS. 1 and 2, creates a seal at the interface of the transmission input shaft and the turbine hub 10.

The lock-up clutch 4 is provided for locking the driving and driven shafts. The lock-up clutch 4 is generally activated after starting of the motor vehicle and after hydraulic coupling of the driving and driven shafts, in order to avoid the loss of efficiency caused in particular by slip phenomena between the turbine wheel 5 and the impeller wheel 6. Specifically, the lock-up clutch 4 is provided to bypass the impeller wheel 6 and the turbine wheel 5 when in the closed state thereof.

The lock-up clutch 4 includes a substantially annular locking piston 14 including an annular friction liner 15 fixedly attached to an axially outer surface of the locking piston 14 that faces a locking wall 2a of the casing 2 by any appropriate means known in the art, such as by adhesive bonding. As best shown in FIGS. 1 and 2, the friction liner 15 is fixedly attached to the axially outer surface of the locking piston 14 at a radially outer peripheral end $14_1$ thereof The locking piston 14 is axially displaceable toward (an engaged (or locked) position of the lock-up clutch 4) and away (a disengaged (or open) position of the lock-up clutch 4) from the locking wall 2a inside the casing 2. Moreover, the locking piston 14 is axially displaceable away from (the engaged (or locked) position of the lock-up clutch 4) and toward (the disengaged (or open) position of the lock-up clutch 4) the turbine hub 10.

Figure 2:
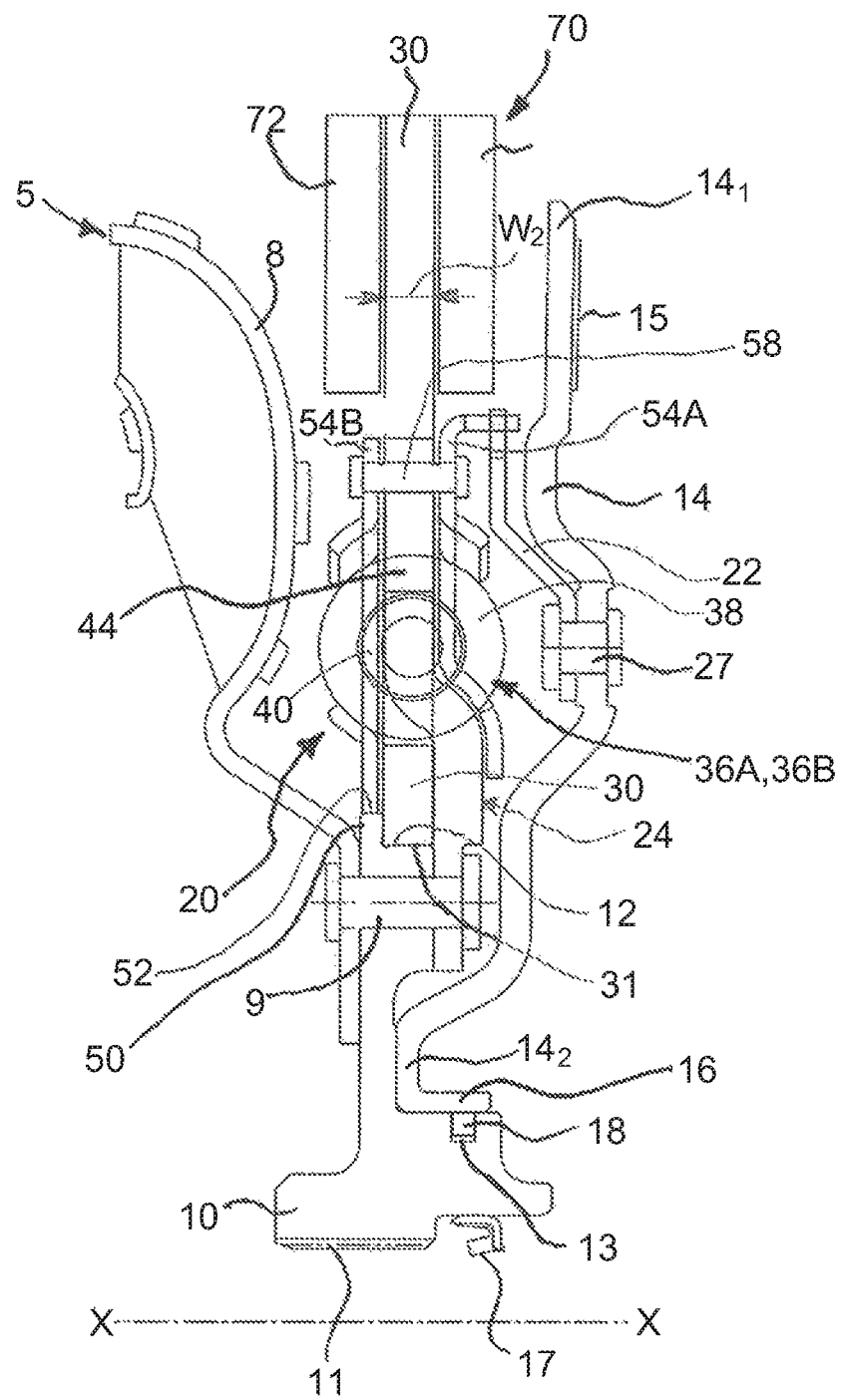
FIG. 2 is a fragmentary cross-sectional half-view of the hydrokinetic torque coupling device in accordance with the exemplary embodiment of the present invention.

Specifically, extending axially at a radially inner peripheral end $14_2$ of the locking piston 14 is a substantially cylindrical flange 16 that is proximate to the rotational axis X, as best shown in FIGS. 1 and 2. The substantially cylindrical flange 16 of the locking piston 14 is rotatable relative to the turbine hub 10. The sealing member (e.g., the sealing ring) 18 creates a seal at the interface of the substantially cylindrical flange 16 and the turbine hub 10. As discussed in further detail below, the locking piston 14 is axially movably relative to turbine hub 10 along this interface.

The locking piston 14 is provided to be selectively pressed against the locking wall 2a of the casing 2, so as to lock up the torque coupling device 1 between the shafts so to control sliding movement between the turbine wheel 5 and the impeller wheel 6. Specifically, when an appropriate hydraulic pressure in applied to the locking piston 14, the locking piston 14 moves rightward (as shown in FIGS. 1 and 2) toward the locking wall 2a of the casing 2 and away from the turbine wheel 5, and clamps the friction liner 15 between itself and the locking wall 2a of the casing 2. As a result, the lock-up clutch 4 is in the locked position and is mechanically coupled to the turbine hub 10 so as to bypass the impeller wheel 6 and the turbine wheel 5 when in the locked position of the lock-up clutch 4.

During operation, when the lock-up clutch 4 is in the disengaged (open) position, the engine torque is transmitted from the impeller wheel 6 by the turbine wheel 5 of the torque converter 3 to the turbine hub 10. When the lock-up clutch 4 is in the engaged (locked) position, the engine torque is transmitted by the casing 2 to the turbine hub 10 through the torsional vibration damper 20.

The torsional vibration damper 20 advantageously allows the turbine wheel 5 of the torque converter 3 to be coupled, with torque damping, to the input shaft of the automatic transmission. The torsional vibration damper 20 also allows damping of stresses between a first, drive shaft (not shown) and a second, driven shaft (not shown) that are coaxial with the rotation axis X, with torsion damping.

Figure 3:
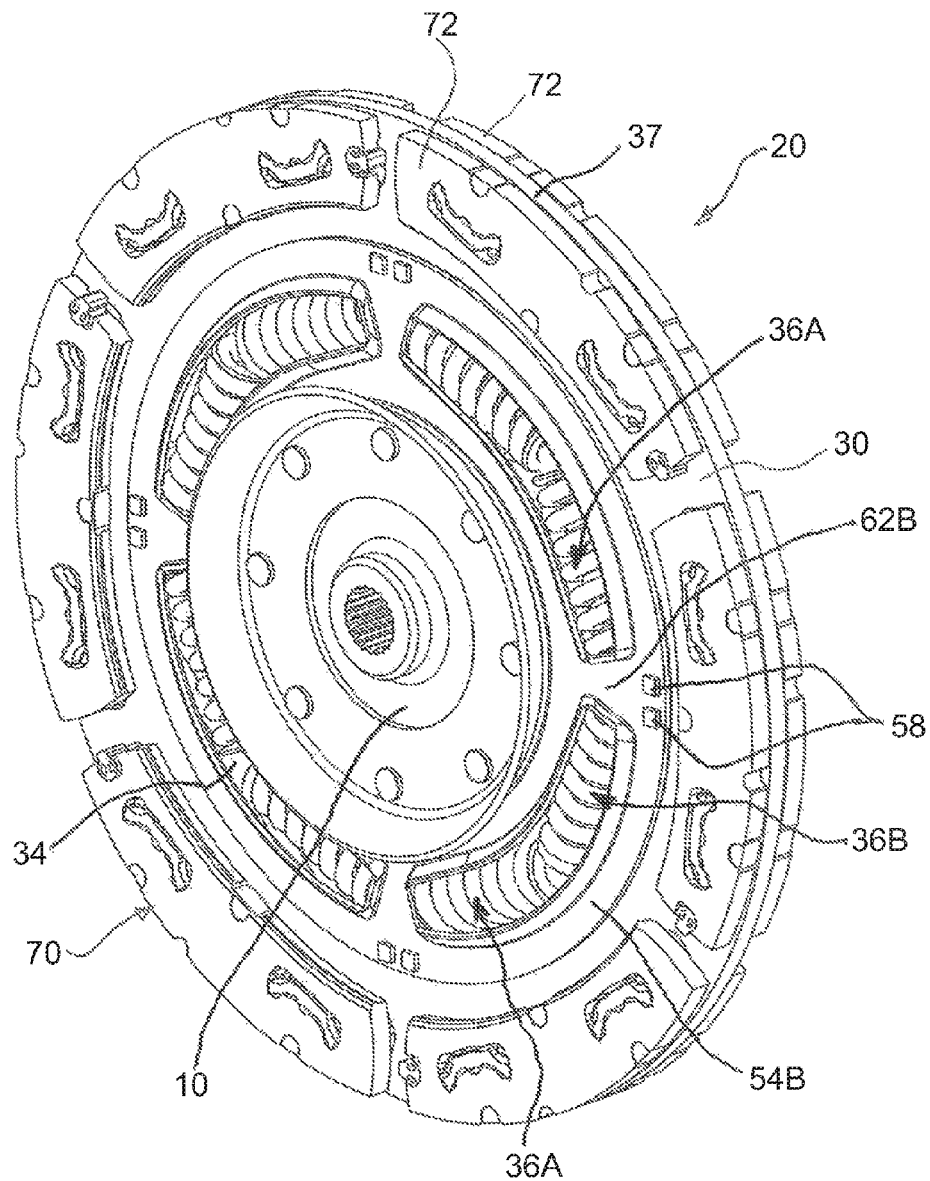
FIG. 3 is a perspective view of a torsional vibration damper in accordance with the exemplary embodiment of the present invention.

The torsional vibration damper 20, as best shown in FIGS. 1-3, is disposed between the turbine hub 10 that is fixedly (i.e., non-movably) connected with the turbine shell 8 of the turbine wheel 3, and the locking piston 14 of the lock-up clutch 4. Moreover, the locking piston 14 of the lock-up clutch 4 is rotatably coupled to the turbine wheel 5 and the turbine hub 10 by the torsional vibration damper 20. The torsional vibration damper 20 is arranged on the turbine hub 10 in a limited, movable and centered manner. The turbine hub 10 forms an output part of the torsional vibration damper 20 and a driven side of the torque coupling device 1, and is splined with the driven shaft. The locking piston 14, on the other hand, forms an input part of the torsional vibration damper 20.

During the operation, when the lock-up clutch 4 is in the disengaged (open) position, the engine torque is transmitted by the turbine wheel 5 of the torque converter 3 from the impeller wheel 6 to the turbine hub 10, bypassing the torsional vibration damper 20. However, when the lock-up clutch 4 is in the engaged (locked) position, the engine torque is transmitted by the casing 2 to the turbine hub 10 through the torsional vibration damper 20.

As best shown in FIGS. 3-7, the torsional vibration damper 20 comprises a substantially annular drive member 22 non-movably (i.e., fixedly) secured to the locking piston 14, a substantially annular driven member 24 rotatably coupled to the drive member 22, and a substantially annular back plate 30 mounted about the turbine hub 10 and rotatably moveable relative thereto and the driven member 24.

Specifically, the back plate 30 has a substantially cylindrical radially inner peripheral surface 31, while the turbine hub 10 has a substantially cylindrical radially outer support surface 12. As best shown in FIG. 2, the radially inner peripheral surface 31 of the back plate 30 is rotatably mounted outwardly of the radially outer support surface 12 of the turbine hub 10 so that the back plate 30 is rotatably supported by the turbine hub 10. Placing the back plate 30 over the turbine hub 10 ensures centering of the back plate 30 and increases the rigidity thereof. Moreover, the turbine hub 10 has a turbine flange 50 extending radially outwardly from the outer support surface 12 of the turbine hub 10. The turbine flange 50 has a substantially cylindrical radially outer peripheral surface 52.

Specifically, the annular back plate 30 is formed with a central aperture for fitting on the turbine hub 10. The central aperture in the back plate 30 is defined by a substantially cylindrical radially inner peripheral surface 31 of the back plate 30, while the turbine hub 10 has a substantially cylindrical radially outer support surface 12. As best shown in FIG. 2, the substantially cylindrical radially outer support surface 12 of the turbine hub 10 is adjacent and complementary to the substantially cylindrical radially inner peripheral surface 31 of the back plate 30. Moreover, the radially inner peripheral surface 31 of the back plate 30 is rotatably mounted over the radially outer support surface 12 of the turbine hub 10. Placing the back plate 30 over the turbine hub 10 ensures centering of the back plate 30 and increases the rigidity thereof.

As best shown in FIGS. 1-6, the annular drive member 22, the annular driven member 24, and the annular back plate 30 are coaxial with each other and rotatable about the rotation axis X. The driven member 24 is fixedly (i.e., non-movably) secured to the turbine hub 10 by any appropriate means, such as by the rivets 9 or welding. Thus, the turbine shell 8 of the turbine wheel 5 is fixedly secured to both the turbine hub 10 and the driven member 24 by any appropriate means, such as by the rivets 9 or welding. The drive member 22 is non-movably secured to the locking piston 14 by any appropriate means, such as by the rivets 27 or welding. The drive member 22 includes external, radially outwardly extending tabs (or teeth) 23 for driving engagement with the damper assembly 20, as described below. The drive member 22 with the outwardly extending tabs 23 is preferably an integral part, e.g., made of a single or unitary component, but may be separate components fixedly connected together.

Figure 5:
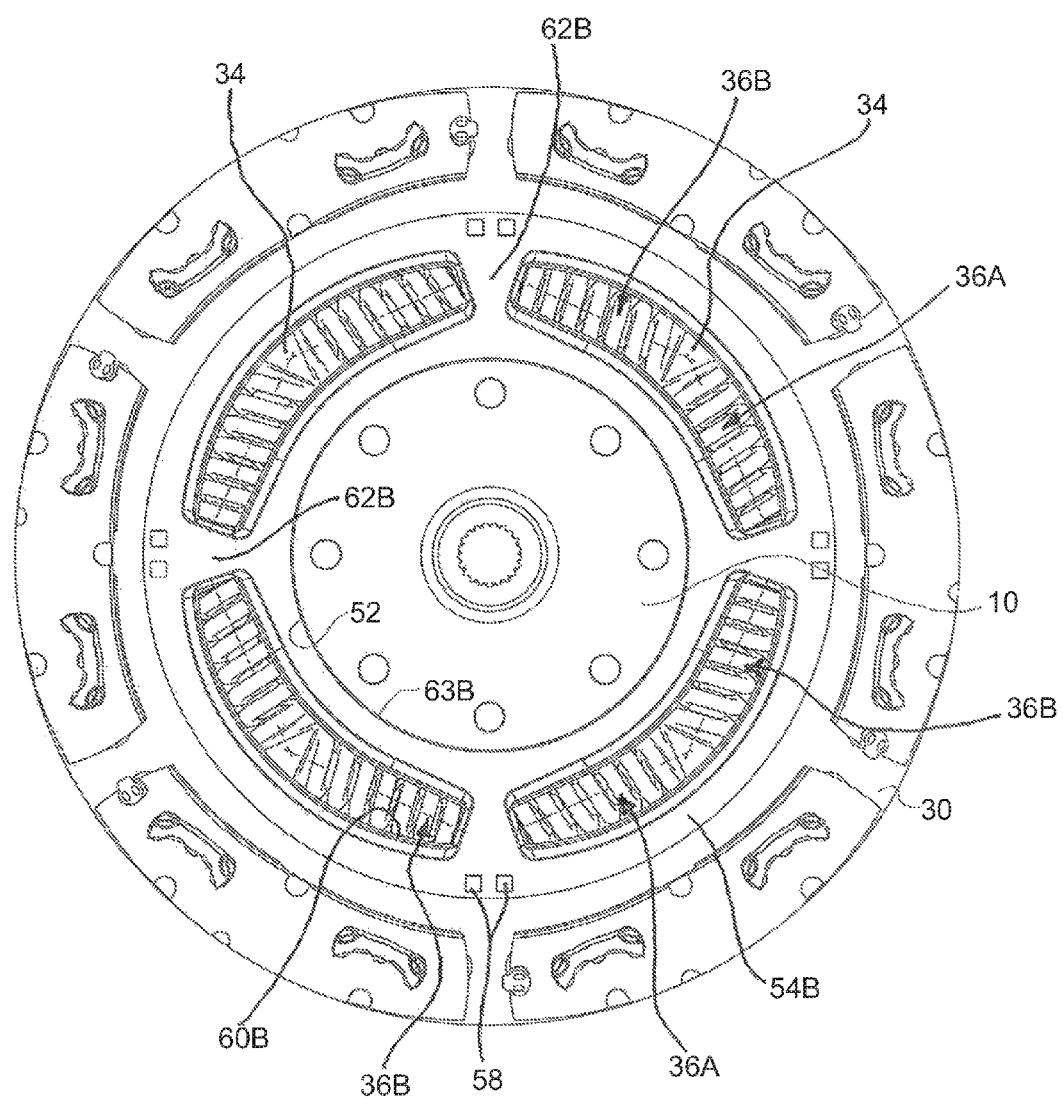
FIG. 5 is a front view of the torsional vibration damper in accordance with the exemplary embodiment of the present invention.
Figure 6:
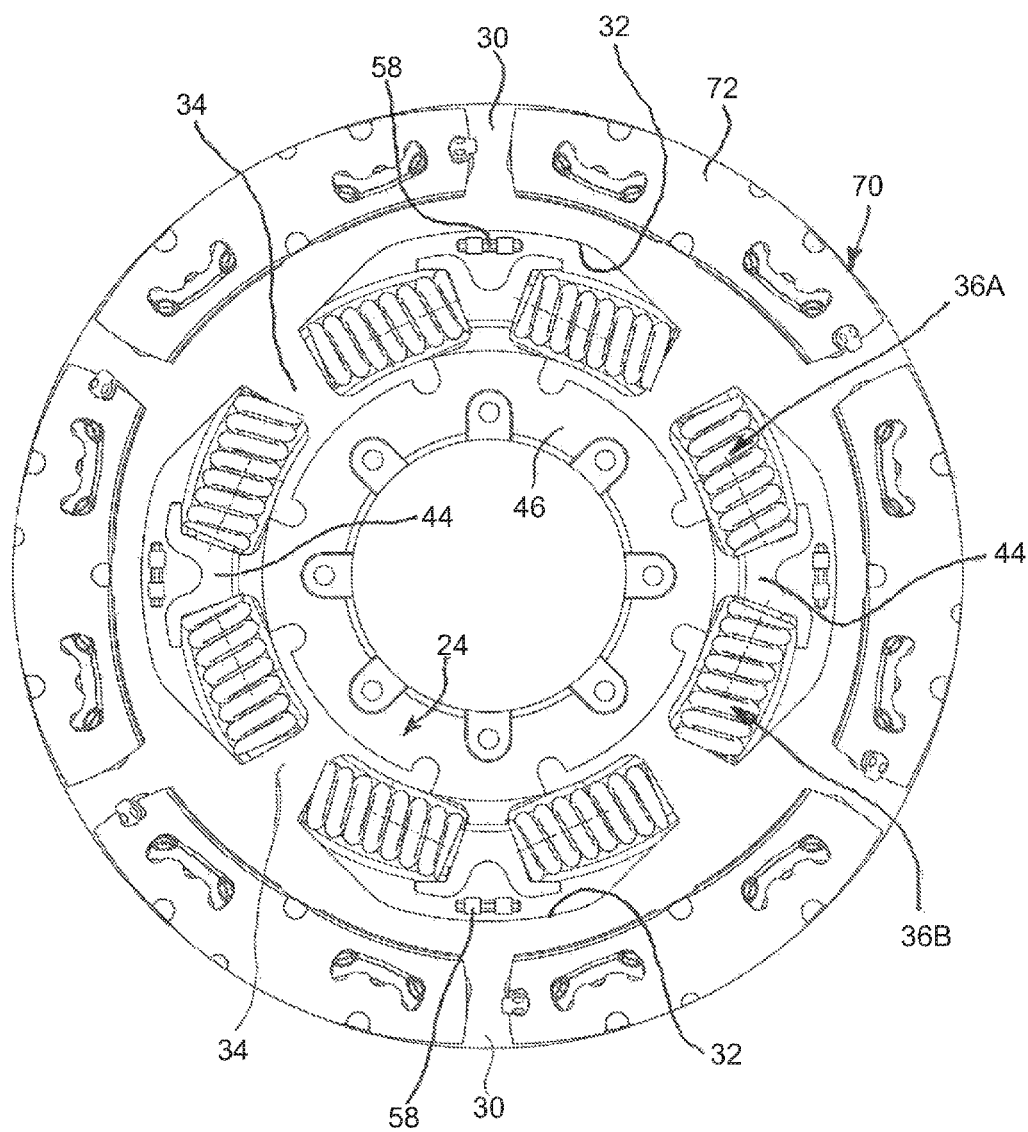
FIG. 6 is a front view of the torsional vibration damper in accordance with the exemplary embodiment of the present invention without a damper retainer plate.
Figure 7:
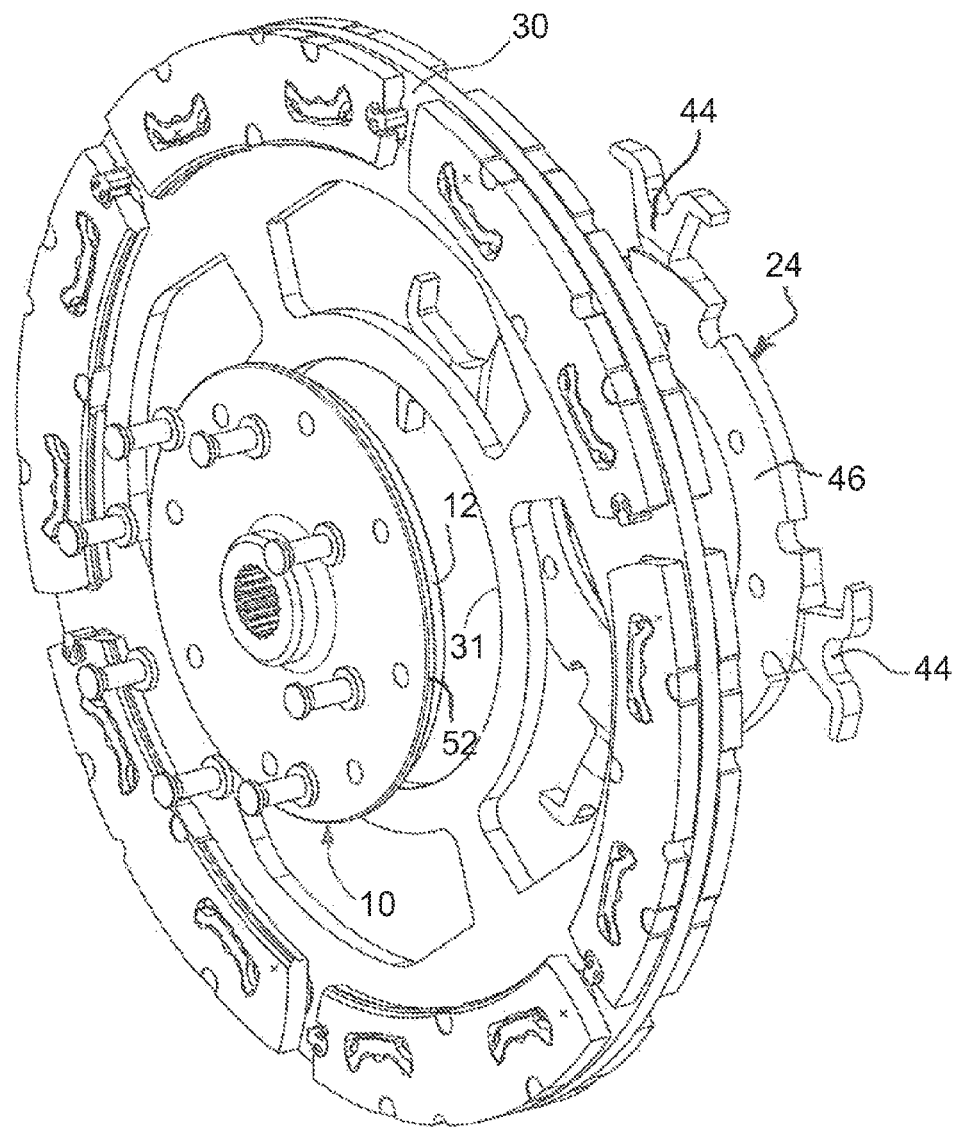
FIG. 7 is a partial exploded assembly view of the torsional vibration damper in accordance with the exemplary embodiment of the present invention without the damper retainer plates and elastic members.
Figure 8:
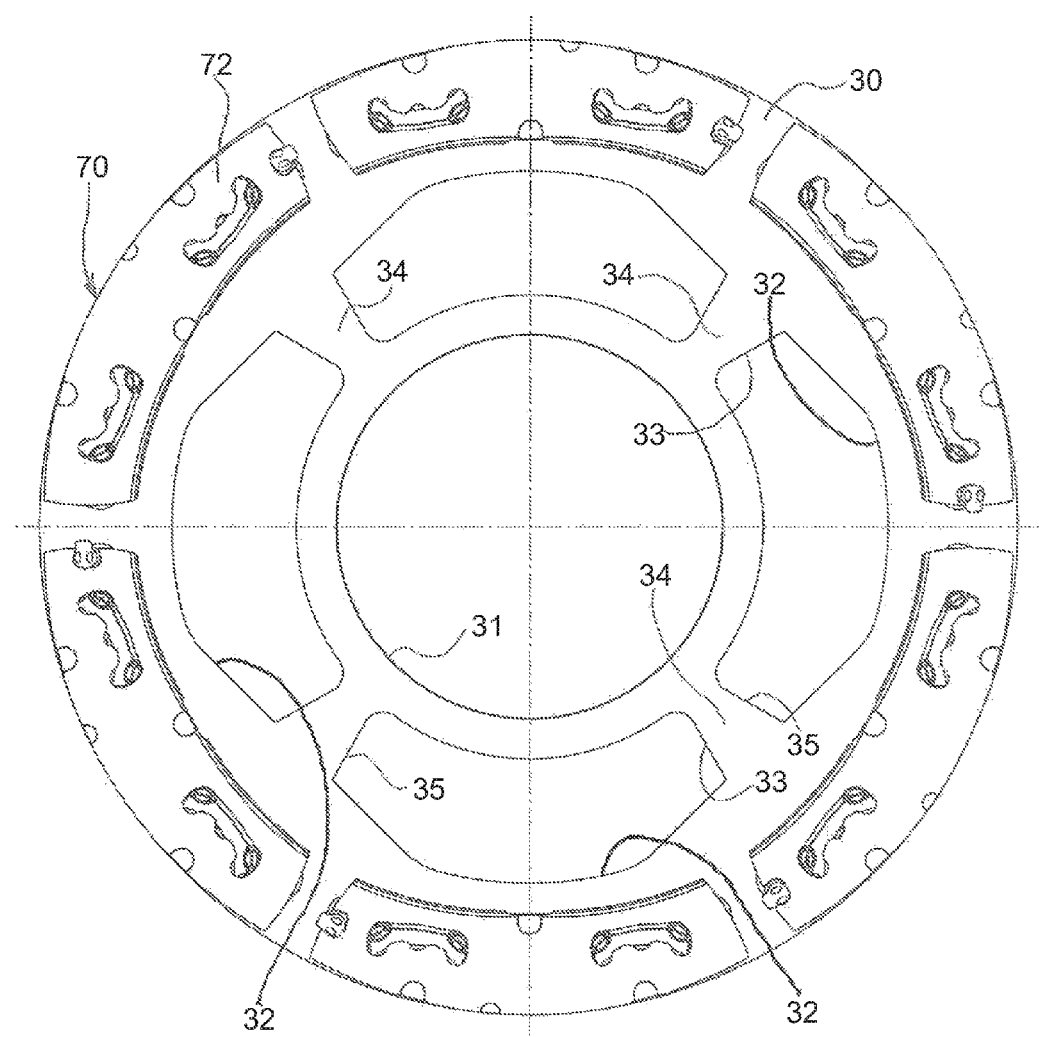
FIG. 8 is a front view of a pendulum back plate in accordance with the exemplary embodiment of the present invention with a centrifugal pendulum oscillator.

The torsional vibration damper 20 further comprises a plurality of first circumferentially acting elastic members 36A and a plurality of second circumferentially acting elastic members 36B disposed in series relative to each other between the driven member 24 and the intermediate plate 30, as best shown in FIG. 3. According to the exemplary embodiment of the present invention, the first and second elastic members 36A and 36B are identical to each other. In non-limiting fashion, the torsional vibration damper 20 according to the exemplary embodiment of the present invention has eight elastic members 36A, 36B, as best shown in FIGS. 3-6. Further according to the exemplary embodiment of the present invention, the elastic members 36A, 36B are in the form of helical (or coil) springs having a principal axis oriented substantially circumferentially. Furthermore, each of the first and second elastic members 36A and 36B includes a pair of coaxial helical springs, as best shown in FIGS. 2 and 6. Specifically, as illustrated in FIGS. 2 and 6, each of the first and second elastic members 36A and 36B includes an external large-diameter spring 38 and an internal small-diameter spring 40, arranged coaxially so that the internal spring 40 is disposed within the external spring 38. Moreover, the external spring 38 has a longer length and is produced from a larger diameter wire than the internal spring 40, thus providing variable stiffness to the first and second elastic members 36A, 36B. Alternatively, each of the first and second elastic members 36A and 36B includes only one coaxial helical spring.

The driven member 24, best shown in FIGS. 9 and 10, includes a substantially annular, flat central plate 46 and a plurality of external radial lugs 44 extending radially outwardly from the central plate 46. The external radial lugs 44 are arranged to cooperate with the circumferentially acting the elastic members 36A, 36B. As illustrated, the external radial lugs 44 extend radially outwardly from the central plate 46 of the driven member 24. Moreover, each of the external radial lugs 44 of the driven member 24 and the central plate 46 thereof are preferably integral with one another, e.g., made of a single or unitary component, but may be separate components fixedly connected together. The external radial lugs 44 are spaced apart circumferential equidistantly around the rotation axis X. Each of the external radial lugs 44 has circumferentially positioned first and second radial retention faces 45A and 45B, respectively. As best shown in FIG. 6, the first retention faces 45A of the external radial lugs 44 engage the first elastic members 36A, while the second retention faces 45B of the external radial lugs 44 engage the second elastic members 36B. Also, each of the external radial lugs 44 has two circumferentially opposite, circumferentially extending gripping portions 49, as best shown in FIG. 9, provided for retaining distal ends of the elastic members 36A, 36B on the retention faces 45A and 45B of each of the external radial lugs 44. Each of the external radial lugs 44 has a substantially cylindrical outer peripheral surface 48.

As best shown in FIG. 10, each of the external radial lugs 44 of the driven member 24 and the central plate 46 thereof have the same thickness $W_1$ in the axial direction, i.e., in the direction of the rotation axis X. Moreover, as best shown in FIG. 10, each of the external radial lugs 44 of the driven member 24 is axially offset from the central plate 46 thereof. Preferably the amount of the axial offset of the radial lugs 44 of the driven member 24 relative to the central plate 46 thereof equals to thickness $W_1$ of the central plate 46 thereof in the axial direction. As best shown in FIG. 2, the back plate 30 is sandwiched between the turbine flange 50 of the turbine hub 10 and the central plate 46 of the driven member 24.

The central plate 46 of the driven member 24 and the back plate 30 each is in the form of a substantially annular plate having axially opposite and substantially plane (or flat) surfaces. It is well known in the art that a plane surface is a surface in which if any two points are chosen a straight line joining them lies wholly in that surface. It is also known in the art that even for a single planar plate, the axially opposite surfaces are not perfectly planar (or flat) as they are subject to manufacturing tolerances (or variations) around a nominal value as allowed in the production thereof. The present invention seeks to substantially approximate axially opposite plane surfaces of the annular plate so that the axially opposite plane surfaces are substantially planar surfaces.

Moreover, the opposite plane surfaces of each of the radial lugs 44 of the driven member 24 and the back plate 30 have free radially outer and inner perimeters lying in the same plane. Furthermore, each of the radial lugs 44 of the driven member 24 and the back plate 30 are aligned (or are in alignment) with each other along a radial axis perpendicular to the rotation axis X, as best shown in FIG. 2.

Furthermore, the radial lugs 44 of the driven member 24 and the back plate 30 have the same thickness in the axial direction, i.e., in the direction of the rotation axis X. Such an arrangement reduces the number of stamping blanks and minimizes scrap waste, thus reducing manufacturing cost. In other words, as best shown in FIGS. 2 and 10, the thickness $W_1$ of the driven member 24 in the axial direction equals to a thickness $W_2$ of the back plate 30 in the axial direction. Furthermore, driven member 24 and the back plate 30 are made of the same material, such as steel.

As best illustrated in FIGS. 4, 6, 7 and 8, the back plate 30 has window-shaped openings 32 spaced circumferentially equidistantly around the rotation axis X. Each of the window-shaped openings 32 of the back plate 30 has radial end faces 33, 35 circumferentially spaced from one another. Each of the window-shaped openings 32 of the back plate 30 receives one pair of the first and second elastic members 36A, 36B therein, as best shown in FIG. 6.

The window-shaped openings 32 are separated circumferentially from one another alternately by radial tabs 34, as best shown in FIG. 6. The back plate 30 according to the exemplary embodiment of the present invention has four windows 32 and four radial tabs 34. Moreover, each of the windows 32, or each of the radial tabs 34, is delimited circumferentially by a first radial end face 33 on the one hand, and by a second radial end face 35 on the other hand, oriented circumferentially opposite to each other. Thus, each of the radial tabs 34 is interposed circumferentially between two elastic members 36A, 36B in series of each pair. The first radial end face 33 and the second radial end face 35 that are interposed between elastic members 36A, 36B of a single pair are thus carried by one common radial tab 34.

As further shown in FIG. 6, the elastic members 36A, 36B of each pair are disposed and compressed between the external radial lugs 44 of the driven member 24 in order to damp sudden changes in torque. In non-limiting fashion, in accordance with the exemplary embodiment of the present invention, each of the external radial lugs 44 has a substantially triangular shape extending radially inwardly.

Figure 4:
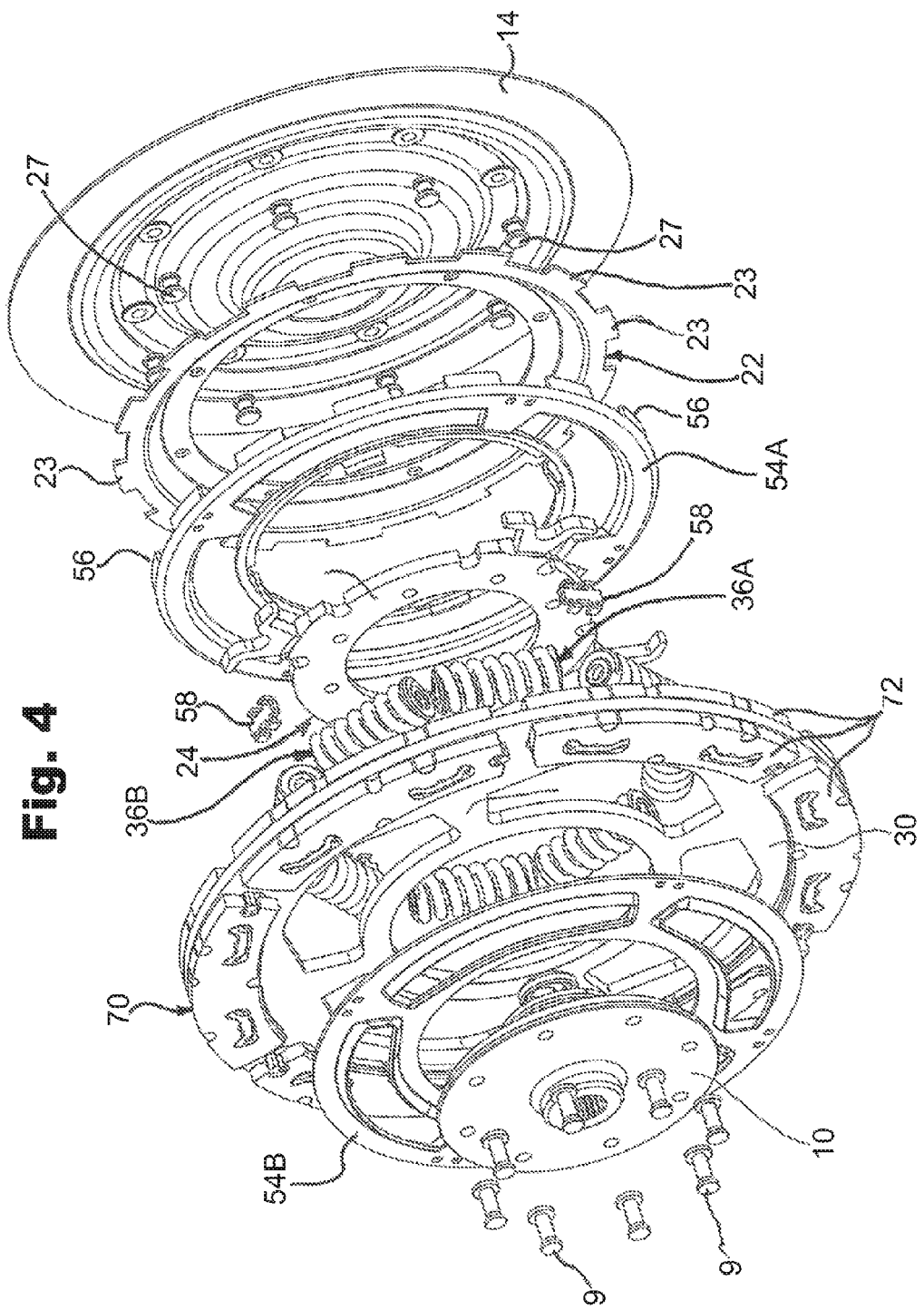
FIG. 4 is an exploded assembly view of the torsional vibration damper in accordance with the exemplary embodiment of the present invention.

The torsional vibration damper 20 further comprises a first, rear damper retainer plate 54A and a second, front damper retainer plate 54B, as best shown in FIG. 4. The first and second damper retainer plates 54A, 54B are mounted adjacent to axially opposite sides (surfaces) of the back plate 30 so as to be oriented parallel to each other and coaxially with the rotation axis X. Moreover, the first and second damper retainer plates 54A, 54B are arranged axially on either side of the elastic members 36A, 36B and are operatively connected therewith. The first and second damper retainer plates 54A, 54B are non-movably (i.e., fixedly) secured to one another by any appropriate means, such as by fasteners or welding so as to rotatable relative to the back plate 30. According to the exemplary embodiment of the present invention, the first and second damper retainer plates 54A, 54B are fixedly secured to one another by fasteners 58 extending through the window-shaped openings 32 through the back plate 30, as best shown in FIG. 6. Thus, the first and second damper retainer plates 54A, 54B are non-rotatable relative to one another, but rotatable relative to the back plate 30. As best shown in FIGS. 2 and 5, a radially inner peripheral surface 63B of the second retainer plate 54B is rotatably mounted over the radially outer peripheral surface 52 of the turbine hub 10. Placing the second retainer plate 54B over the turbine hub 10 ensures centering of the second retainer plate 54B (and the first retainer plate 54A) and increases the rigidity thereof.

As best shown in FIGS. 1-2, the first retainer plate 54A is non-rotatably connected to the drive plate 22. Specifically, as best shown in FIG. 11, the first retainer plate 54A includes external, axially outwardly extending tabs (or teeth) 56 drivingly (i.e., non-rotatably) engaged with the radially external tabs 23 of the drive plate 22. The first retainer plate 54A with the axially extending tabs 56 is preferably an integral part, e.g., made of a single or unitary component, but may be separate components fixedly connected together.

When the lock-up clutch 4 is closed, the torque-flow path runs from the casing 2 and the friction engagement of the control piston 14 with the friction linings 15 to the drive plate 22 which, by means of the axial non-rotatable connection with the toothed first retainer plate 54A transmits the torque to the first and second retainer plates 54A, 54B and the back plate 30. From the first and second retainer plates 54A, 54B and the back plate 30, the torque flow is smoothed in the damper 20 and transmitted to the driven member 24 and turbine hub 10 by means of the first and second elastic members 36A, 36B. In other words, each of the first and second retainer plates 54A, 54B is elastically coupled to the back plate 30 through the elastic members 36A, 36B, and the back plate 30 is elastically coupled to the driven member 24 through the elastic members 36A, 36B.

The first retainer plate 54A has a substantially annular outer mounting flange 57A provided with a plurality of circumferentially spaced holes 59A, as best shown in FIGS. 11-12. The second retainer plate 54B, on the other hand, has a substantially annular outer mounting flange 57B provided with a plurality of circumferentially spaced holes 59B, as best shown in FIGS. 13-14. The first and second retainer plates 54A, 54B are non-movably (i.e., fixedly) secured to one another so that the outer mounting flanges 57A, 57B of the first and second retainer plate 54A, 54B are engaging the axially opposite surfaces of the back plate 30 by the rivets 58 extending through the holes 59A, 59B in the outer mounting flanges 57A, 57B of the first and second damper retainer plates 54A, 54B and the corresponding window-shaped openings 32 in the back plate 30. Consequently, the first and second damper retainer plates 54A, 54B are non-rotatable relative to one another, but rotatable relative to the back plate 30. As further illustrated in FIGS. 1 and 2, the back plate 30 and the driven member 24 are disposed axially between the first and second damper retainer plate 54A, 54B.

Each of the first and second damper retainer plates 54A, 54B is provided with a plurality of circumferentially extending windows 60A, 60B, respectively, each of which is arranged in correspondence with a pair of the elastic member 36A, 36B, as depicted in FIG. 5. Thus, each of the windows 60A, 60B receives a single pair of elastic members; i.e., one of the first elastic members 36A and one of the second elastic members 36B separated by the radial tabs 34 of the back plate 30, as best shown in FIGS. 5 and 6.

The windows 60A, 60B are separated circumferentially from one another alternately by radial tabs 62A, 62B. Each of the first and second damper retainer plates 54A, 54B according to the exemplary embodiment of the present invention has four windows 60A, 60B and four radial tabs 62A, 62B as best shown in FIGS. 11-14. Moreover, each of the windows 60A, 60B, or each of the radial tabs 62A, 62B, is delimited circumferentially by a first radial end face 64A, 64B on the one hand, and by a second radial end face 66A, 66B on the other hand, oriented circumferentially opposite to each other. Thus, each of the radial tabs 62A, 62B is interposed circumferentially between the two elastic members 36A, 36B in series of each pair. The first radial end face 64A, 64B and the second radial end face 66A, 66B that are interposed between elastic members 36A, 36B of a single pair are thus carried by one common radial tab 62A, 62B.

The radial tabs 62A of the first retainer plate 54A are arranged in axial correspondence (i.e., angularly aligned) with the radial tabs 62B of second retainer plate 54B. As best shown in FIGS. 5 and 6, the external radial lugs 44 of the driven member 24 is radially aligned with the radial tabs 62A, 62B separating the windows 60A, 60B in the first and second damper retainer plates 54A, 54B. Consequently, the windows 60A of the first retainer plate 54A are arranged in axial correspondence (i.e., angularly aligned) with the windows 60B of second retainer plate 54B.

The torsional vibration damper 20 further comprises a centrifugal pendulum oscillator 70 coaxial with the rotation axis X. The centrifugal pendulum oscillator 70 includes a plurality of pairs of axially opposed pendulum masses (or flyweights) 72 arranged on an outer radial periphery of the back plate 30 in order to be subjected to a maximum centrifugal force in the course of the rotation of the torsional vibration damper 20 around the rotation axis X, as best shown in FIGS. 1-7. The pendulum masses 72 are mounted to the back plate 30 on axially opposite sides thereof and adjacent to an outer peripheral surface 37 thereof. The pendulum masses 72 are connected to each other through a through opening in the back plate 30 to create a pendulum mass pair moveable relative to the back plate 30. The flyweights 72 are arranged radially on the same diameter, i.e. at the same distance from the rotation axis X, and outside the elastic members 36A, 36B.

The operation of the torsional vibration damper 20 in the locked position is as follows. Abrupt changes in torque are transmitted from the locking piston 14 to the first retainer plate 54A, which constitutes an input member of the torsional vibration damper 20, and from the first retainer plate 54A to the driven member 24, which constitutes an output member of the torsional vibration damper 20. The elastic members of each pair of the elastic members 36A, 36B are compressed between the external radial lugs 44 of the driven member 24 and the radial tabs 34 of the back plate 30, which constitutes an intermediate member of the torsional vibration damper 20, in order to damp abrupt changes in torque. Specifically, each of the external radial lugs 44 loads the associated one of the elastic members 36A, 36B. The one of the elastic members 36A, 36B conveys this torque to another of the elastic members 36A, 36B via the radial tabs 34 of the back plate 30. Then, the other of the elastic members 36A, 36B transmit the force to the associated radial tabs 62A, 62B of the first and second damper retainer plates 54A, 54B. More specifically, the driven member 24 rotates through a defined angle around rotation axis X with respect to the back plate 30, causing simultaneous compression of the elastic members 36A, 36B of each pair. The external radial lugs 44 of the driven member 24 transmit the compressive force from one of the elastic members 36A, 36B to the other through the internal radial tabs 34 of the back plate 30. Because of this compression, the first and second damper retainer plates 54A, 54B rotate through a portion of the defined angle with respect to the driven member 24. Subsequently, the torque, dampened by the elastic members 36A, 36B, is transmitted from the first damper retainer plate 54A to the driven member 24.

The method of manufacturing of the torsional vibration damper 20 comprises the following major steps. First, a blank sheet of material, such as steel, is provided in the form of a flat steel sheet having axially opposite substantially planar surfaces and a uniform thickness. Then, the driven member 24 and the back plate 30 are cut from the same blank sheet, such as by stamping. The driven member 24 includes the external radial lugs 44 extending radially outwardly from the annular central plate 46 of the driven member 24. Next, the driven member 24 is further formed so that the external radial lugs 44 of the driven member 24 are axially offset from the central plate 46 thereof to the amount equals to the thickness W of the central plate 46 in the axial direction, such as by press process. Also, a plurality of window-shaped openings 32 separated circumferentially from one another by radial tabs are formed in the back plate 30, such as by punching.

Next, the driven member 24 is rotatably mounted about the back plate 30 coaxially with the rotation axis X so that the external radial lugs 44 of the driven member 24 are disposed within the window-shaped openings 32 of the back plate 30, while the annular central plate 46 of the driven member 24 is axially offset from the back plate 30 and disposed axially adjacent to the back plate 30. After that, the elastic members 36A, 36B are mounted circumferentially between the external radial lugs 44 of the driven member 24 and the radial tabs 34 of the back plate 30. Subsequently, the first and second damper retainer plates 54A, 54B are fixedly attached to the axially opposite sides of the back plate 30 by the fasteners 58 so that the elastic members 36A, 36B are disposed axially between the first and second damper retainer plates 54A, 54B, and in the windows 60A, 60B in the first and second damper retainer plates 54A, 54B. Then, the axially extending tabs 56 of the first retainer plate 54A are drivingly engaged with the radially external tabs 23 of the drive plate 22.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the hydrokinetic torque coupling device comprising:
    a casing rotatable about a rotation axis;
    a torque converter including an impeller wheel and a turbine wheel disposed in the casing coaxially with the rotation axis;
    a turbine hub disposed in the casing coaxially with the rotation axis and non-rotatably secured to the turbine wheel;
    a torsional vibration damper comprising:
        a driven member rotatable about the rotation axis and non-rotatably secured to the turbine hub;
        a back plate rotatably mounted to the turbine hub and centered by the turbine hub coaxially with the rotation axis, the back plate having a plurality of window-shaped openings separated circumferentially from one another by radial tabs;
        a plurality of circumferentially acting elastic members interposed between the driven member and the back plate in the window-shaped openings;
        a first damper retainer plate rotatably mounted to the back plate coaxially with the rotation axis, the first damper retainer plate elastically coupled to the back plate through the elastic members; and
        a centrifugal pendulum oscillator mounted to the back plate coaxially with the rotation axis and aligned with the back plate along a radial axis perpendicular to the rotation axis;
        the elastic members interposed between the driven member plate and the first damper retainer plate.

2. The hydrokinetic torque coupling device as defined in claim 1, wherein the back plate is a flat plate having axially opposite plane surfaces.

3. The hydrokinetic torque coupling device as defined in claim 2, wherein the driven member includes a substantially annular flat central plate and a plurality of external radial lugs extending radially outwardly from the central plate; wherein the circumferentially acting elastic members are interposed between the external radial lugs of the driven member and the radial tabs of the back plate in the window-shaped openings; and wherein the elastic members are interposed between the external radial lugs of the driven member plate and the first damper retainer plate.

4. The hydrokinetic torque coupling device as defined in claim 3, wherein the external radial lugs of the driven member are axially offset from the central plate thereof so that the external radial lugs of the driven member are disposed within the window-shaped openings of the back plate; wherein the annular central plate of the driven member is axially offset from the back plate and disposed axially adjacent to the back plate; and wherein the external radial lugs are arranged to cooperate with the circumferentially acting elastic members.

5. The hydrokinetic torque coupling device as defined in claim 4, wherein the external radial lugs of the driven member and the back plate are aligned along a radial axis perpendicular to the rotation axis.

6. The hydrokinetic torque coupling device as defined in claim 4, wherein an amount of the axial offset of the radial lugs of the driven member relative to the central plate thereof equals the thickness of the back plate in the axial direction.

7. The hydrokinetic torque coupling device as defined in claim 6, wherein the driven plate and the back plate have the same thicknesses in the direction of the rotation axis.

8. The hydrokinetic torque coupling device as defined in claim 4, wherein the back plate has a substantially cylindrical radially inner peripheral surface, and wherein the turbine hub has a substantially cylindrical radially outer support surface such that the radially inner peripheral surface of the back plate is rotatably mounted over the radially outer support surface of the turbine hub.

9. The hydrokinetic torque coupling device as defined in claim 8, wherein the turbine hub has a turbine flange extending radially outwardly from the outer support surface of the turbine hub so that the back plate is sandwiched between the turbine flange of the turbine hub and the central plate of the driven member.

10. The hydrokinetic torque coupling device as defined in claim 3, wherein the first damper retainer plate has with a plurality of circumferentially oriented windows separated circumferentially from one another by radial tabs; and wherein the elastic members are interposed between the external radial lugs of the driven member plate and the radial tabs of the first damper retainer plate in the window through the first damper retainer plate.

11. The hydrokinetic torque coupling device as defined in claim 10, wherein each of the windows in the first damper retainer plate receives a single pair of the elastic members.

12. The hydrokinetic torque coupling device as defined in claim 10, further comprising a second damper retainer plate non-moveably secured to the first damper retainer plate coaxially with the rotation axis; wherein the first damper retainer plate and the second damper retainer plate are mounted adjacent to axially opposite surfaces of the back plate; and wherein the second damper retainer plate is operatively connected to the elastic members.

13. The hydrokinetic torque coupling device as defined in claim 12, wherein the second damper retainer plate has with a plurality of circumferentially oriented windows separated circumferentially from one another by radial tabs; and wherein the elastic members are interposed between the external radial lugs of the driven member plate and the radial tabs of the second damper retainer plate in the window through the first damper retainer plate; and wherein windows of the first damper retainer plate are angularly aligned with the windows of the second damper retainer plate.

14. The hydrokinetic torque coupling device as defined in claim 1, further comprising:
a lock-up clutch including a locking piston axially moveable along the rotation axis to and from a substantially radial locking wall of the casing so as to selectively engage the locking piston against the locking wall of the casing; and
a drive plate rotatable about the rotation axis and non-rotatably coupled to the locking piston.

15. The hydrokinetic torque coupling device as defined in claim 14, wherein the drive plate is non-rotatably coupled to the first damper retainer plate coaxially with the rotation axis.

16. The hydrokinetic torque coupling device as defined in claim 1, wherein the elastic members are disposed in series relative to each other.

17. A torsional vibration damper for a hydrokinetic torque coupling device, comprising:
a driven member rotatable about a rotation axis;
a back plate rotatable about the rotation axis, the back plate having a plurality of window-shaped openings separated circumferentially from one another by radial tabs;
a plurality of circumferentially acting elastic members interposed between the driven member and the back plate in the window-shaped openings;
a first damper retainer plate rotatably mounted to the back plate coaxially with the rotation axis, the first damper retainer plate elastically coupled to the back plate through the elastic members; and
a centrifugal pendulum oscillator mounted to the back plate coaxially with the rotation axis and aligned with the back plate along a radial axis perpendicular to the rotation axis;
the elastic members interposed between the driven member plate and the first damper retainer plate.

18. The torsional vibration damper as defined in claim 17, wherein the back plate is in the form of a flat plate having axially opposite plane surfaces.

19. The torsional vibration damper as defined in claim 18, wherein the driven member includes a substantially annular flat central plate and a plurality of external radial lugs extending radially outwardly from the central plate; wherein the circumferentially acting elastic members are interposed between the external radial lugs of the driven member and the radial tabs of the back plate in the window-shaped openings; and wherein the elastic members are interposed between the external radial lugs of the driven member plate and the first damper retainer plate.

20. The torsional vibration damper as defined in claim 19, wherein the external radial lugs of the driven member are axially offset from the central plate thereof so that the external radial lugs of the driven member are disposed within the window-shaped openings of the back plate; wherein the annular central plate of the driven member is axially offset from the back plate and disposed axially adjacent to the back plate; and wherein the external radial lugs are arranged to cooperate with the circumferentially acting elastic members.

21. The torsional vibration damper as defined in claim 20, wherein the external radial lugs of the driven member and the back plate are aligned along a radial axis perpendicular to the rotation axis.

22. The torsional vibration damper as defined in claim 20, wherein an amount of the axial offset of the radial lugs of the driven member relative to the central plate thereof equals to a thickness of the back plate in the axial direction.

23. The torsional vibration damper as defined in claim 22, wherein the driven plate and the back plate have the same thicknesses in the direction of the rotation axis.

24. The torsional vibration damper as defined in claim 19, wherein the first damper retainer plate has with a plurality of circumferentially oriented windows separated circumferentially from one another by radial tabs; and wherein the elastic members are interposed between the external radial lugs of the driven member plate and the radial tabs of the first damper retainer plate in the window through the first damper retainer plate.

25. The torsional vibration damper as defined in claim 24, wherein each of the windows in the first damper retainer plate receives a single pair of the elastic members.

26. The torsional vibration damper as defined in claim 24, further comprising a second damper retainer plate non-moveably secured to the first damper retainer plate coaxially with the rotation axis; wherein the first damper retainer plate and the second damper retainer plate are mounted adjacent to axially opposite surfaces of the back plate; and wherein the second damper retainer plate is operatively connected to the elastic members.

27. The torsional vibration damper as defined in claim 26, wherein the second damper retainer plate has with a plurality of circumferentially extending windows separated circumferentially from one another by radial tabs; and wherein the elastic members are interposed between the external radial lugs of the driven member plate and the radial tabs of the second damper retainer plate in the window through the first damper retainer plate; and wherein windows of the first damper retainer plate are angularly aligned with the windows of the second damper retainer plate.

28. The torsional vibration damper as defined in claim 17, further comprising a drive plate rotatable about the rotation axis; wherein the drive plate is non-rotatably coupled to the first damper retainer plate coaxially with the rotation axis.

29. A method for manufacturing a torsional vibration damper for a hydrokinetic torque coupling device, said method comprising the steps of:
 providing a turbine hub coaxial with a rotation axis;
 providing a blank sheet in the form of a flat plate having axially opposite plane surfaces and a uniform thickness;
 cutting the blank sheet so as to form a back plate and a blank for a driven member, the back plate having a plurality of window-shaped openings separated circumferentially from one another by radial tabs;
 forming the driven member by forming a substantially annular flat central plate and a plurality of external radial lugs extending radially outwardly from the central plate so that the external radial lugs of the driven member are axially offset from the central plate thereof;
 providing a plurality of elastic members;
 mounting the back plate rotatably to the turbine hub so as to center the back plate coaxially with the rotation axis;
 mounting the circumferentially acting elastic members between the external radial lugs of the driven member and the radial tabs of the back plate in the window-shaped openings;
 non-rotatably securing the driven member to the to the turbine hub; and
 mounting a plurality of pairs of axially opposed pendulum masses on axially opposite surfaces of the back plate.

30. A hydrokinetic torque coupling device for coupling together a driving shaft and a driven shaft, the hydrokinetic torque coupling device comprising:
 a casing rotatable about a rotation axis;
 a torque converter including an impeller wheel and a turbine wheel disposed in the casing coaxially with the rotation axis;
 a turbine hub disposed in the casing coaxially with the rotation axis and non-moveably secured to the turbine wheel;
 a lock-up clutch including a locking piston axially moveable along the rotation axis to and from a substantially radial locking wall of the casing so as to selectively engage the locking piston against the locking wall of the casing;
 a drive plate rotatable about the rotation axis and non-rotatably coupled to the locking piston; and
 a torsional vibration damper comprising:
  a driven member rotatable about the rotation axis and non-rotatably secured to the turbine hub;
  a back plate rotatably mounted to the turbine hub and centered by the turbine hub coaxially with the rotation axis, the back plate having a plurality of window-shaped openings separated circumferentially from one another by radial tabs;
  a plurality of circumferentially acting elastic members interposed between the driven member and the back plate in the window-shaped openings;
  a first damper retainer plate rotatably mounted to the back plate coaxially with the rotation axis; and
  second damper retainer plate non-moveably secured to the first damper retainer plate coaxially with the rotation axis, the first damper retainer plate and the second damper retainer plate are mounted adjacent to axially opposite surfaces of the back plate;
  the elastic members interposed between the driven member plate and the first and second damper retainer plates;
  the first and second damper retainer plates elastically coupled to the back plate through the elastic members;
  the drive plate is non-rotatably coupled to the first damper retainer plate coaxially with the rotation axis.

31. The hydrokinetic torque coupling device as defined in claim 30, wherein the driven member includes a substantially annular flat central plate and a plurality of external radial lugs extending radially outwardly from the central plate; wherein each of the first and second damper retainer plates has with a plurality of circumferentially oriented windows separated circumferentially from one another by radial tabs; and wherein the elastic members are interposed between the external radial lugs of the driven member plate and the radial tabs of the second damper retainer plate in the window through the first damper retainer plate; and wherein windows of the first damper retainer plate are angularly aligned with the windows of the second damper retainer plate.

* * * * *